(12) United States Patent
Yeager et al.

(10) Patent No.: US 10,323,579 B2
(45) Date of Patent: Jun. 18, 2019

(54) VARIABLE VALVE ACTUATOR HAVING LOW-PRESSURE RELIEF

(71) Applicant: Caterpillar Inc., Peoria, IL (US)

(72) Inventors: Kendall Dean Yeager, Palatine, IL (US); Kevin James Schreader, East Peoria, IL (US); Victor Iskander Yacoub, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 147 days.

(21) Appl. No.: 15/386,627

(22) Filed: Dec. 21, 2016

(65) Prior Publication Data

US 2018/0171881 A1 Jun. 21, 2018

(51) Int. Cl.
*F02D 13/02* (2006.01)
*F01L 13/00* (2006.01)
*F01L 9/02* (2006.01)
*F01L 1/18* (2006.01)
*F01L 1/047* (2006.01)

(52) U.S. Cl.
CPC ............ *F02D 13/0211* (2013.01); *F01L 9/02* (2013.01); *F01L 13/0015* (2013.01); *F01L 1/181* (2013.01); *F01L 2001/054* (2013.01); *F01L 2800/01* (2013.01); *F01L 2800/02* (2013.01); *Y02T 10/18* (2013.01)

(58) Field of Classification Search
CPC ............ F02D 13/0023; F02D 13/0234; F02D 13/0226; F02D 13/0203; F02D 13/0207; F02D 13/0211; F02D 13/0269; F01L 1/04; F01L 1/181; F01L 13/0015; F01L 2013/105; F01L 2201/00; F01L 2800/01; F01L 9/02; F01L 13/0021

USPC ........................................................ 123/90.16
See application file for complete search history.

(56) References Cited

U.S. PATENT DOCUMENTS

| | | | |
|---|---|---|---|
| 6,293,237 B1 | 9/2001 | Vorih | |
| 6,718,921 B2 * | 4/2004 | Grewal | ................... F01L 1/344 123/196 A |
| 6,802,286 B2 | 10/2004 | Fujiwara et al. | |
| 6,843,226 B2 | 1/2005 | Miura | |
| 6,976,459 B2 | 12/2005 | Kagy et al. | |

(Continued)

FOREIGN PATENT DOCUMENTS

JP    2009270487    * 11/2009 ................ F01L 1/34

OTHER PUBLICATIONS

Machine Translation of JP2009270487.*

*Primary Examiner* — Thai Ba Trieu
*Assistant Examiner* — Loren C Edwards
(74) *Attorney, Agent, or Firm* — Finnegan, Henderson, Farabow, Garrett & Dunner, LLP

(57) ABSTRACT

A valve actuation system is disclosed for an engine. The valve actuation system may have a variable valve actuator that is configured to engage a rocker arm and hold the valve at an open position regardless of motion of a cam lobe. The variable valve actuator may have a housing forming a chamber, a plunger disposed in the chamber, a control valve movable to control a flow of fluid into the chamber, and a relief valve configured to automatically open and release fluid from the housing when a pressure inside the chamber is below a predetermined pressure. The valve actuation system may further have a controller configured to cycle the control valve prior to start-up of the engine and to selectively move the control valve after start-up.

17 Claims, 3 Drawing Sheets

(56) References Cited

U.S. PATENT DOCUMENTS

| | | | |
|---|---|---|---|
| 7,178,491 B2 | 2/2007 | Chang | |
| 7,610,897 B2 | 11/2009 | Rayl | |
| 7,748,353 B2 | 7/2010 | Russell et al. | |
| 2006/0065221 A1* | 3/2006 | Kagy | F01L 1/267 |
| | | | 123/90.16 |
| 2006/0131528 A1* | 6/2006 | Long | F16H 61/12 |
| | | | 251/62 |
| 2010/0186696 A1* | 7/2010 | Keller | F01L 13/0015 |
| | | | 123/90.16 |
| 2013/0068195 A1* | 3/2013 | Ruggiero | F02D 13/04 |
| | | | 123/321 |

* cited by examiner

VARIABLE VALVE ACTUATOR HAVING LOW-PRESSURE RELIEF

TECHNICAL FIELD

The present disclosure relates generally to a variable valve actuator, and more particularly, to a variable valve actuator having a low-pressure relief.

BACKGROUND

An internal combustion engine may be equipped with a variable valve actuation (VVA) system that provides for selective adjustment of the timing of engine valves to improve engine efficiency. The VVA system may be controlled to selectively override valve timing provided by a conventional cam-driven actuation system. For example, the timing of the intake and/or exhaust valves may be modified by the VVA system to implement a variation on the typical diesel or Otto cycle known as the Miller cycle. In a "late intake" type Miller cycle, the intake valves of the engine are held open during a portion of the compression stroke of the piston. This may result in an improvement in the overall efficiency of the engine.

Conventional VVA systems are hydraulically powered. Accordingly, changes in properties of the fluid used to operate the VVA systems may change the operation of the systems. For example, an increase or decrease in a rate at which fluid flows the system may result in an increase or decrease in the time required for the system to operate. In particular, when the engine is starting, the operating fluid may have a cold temperature and, thus, a high viscosity. The high viscosity of the fluid increases the amount of time required for the system to operate. This increased operation time may unexpectedly change valve timing and reduce or eliminate any performance gains that may have been achieved by implementing a variation on conventional valve timing. For example, the highly viscous fluid within the valve actuator may hold the intake valves open longer than a desired time, making the engine difficult to start.

One method of solving problems associated with a high viscosity fluid in a hydraulic valve actuation system is described in U.S. Pat. No. 6,976,459 (the '459 patent) issued to Kagy et al. on Dec. 20, 2005. The '459 patent describes a method of controlling an engine having a valve actuation system. The method includes sensing first and second temperatures upon cold start-up of the engine. When the first and second temperatures are a below predetermined value, the valve actuation system is disabled to prevent a variation on conventional engine valve actuation timing.

Although the system and method of the '459 patent may solve some problems associated with cold start-up of an internal combustion engine, they may still be less than optimal. For example, disabling of the valve actuation system in the '459 patent may lead to undesirable emissions and reduce the overall efficiency of the engine until the first and second temperatures rise above the predetermined value.

The VVA system of the present disclosure is directed towards overcoming one or more of the problems set forth above and/or other problems of the prior art.

SUMMARY

In one aspect, the present disclosure is directed to a valve actuation system for an engine. The valve actuation system may include a cam follower configured to ride on and move in accordance with a profile of a cam lobe, a rocker arm having a first end operatively connected to the cam follower, a valve operatively connected to a second end of the rocker arm, and a variable valve actuator that is configured to engage the rocker arm and hold the valve at an open position regardless of motion of the cam lobe. The variable valve actuator may also include a housing forming a chamber, a plunger disposed in the chamber, a control valve movable to control a flow of fluid into the chamber, and a relief valve configured to automatically open and release fluid from the housing when a pressure inside the chamber is below a predetermined pressure value. The valve actuation system may further include a controller configured to cycle the control valve prior to start-up of the engine and to selectively move the control valve after start-up.

In another aspect, the present disclosure is directed to a method of controlling an engine. The method may include moving a control valve during engine operation to hydraulically adjust valve timing of the engine and cycling the control valve for a predetermined number of times prior to start-up of the engine. The method may also include releasing fluid from the control valve when a pressure of the fluid falls below a predetermined pressure value after shut-down of the engine.

In yet another aspect, the present disclosure is directed to a variable valve actuator. The variable valve actuator may include a housing forming a chamber, a plunger disposed in the chamber, and a control valve movable to control a flow of fluid into the chamber. The variable valve actuator may also include a relief valve configured to automatically open and release fluid from the variable valve actuator when a pressure inside the chamber is below a predetermined pressure value.

DETAILED DESCRIPTION

Figure 1:
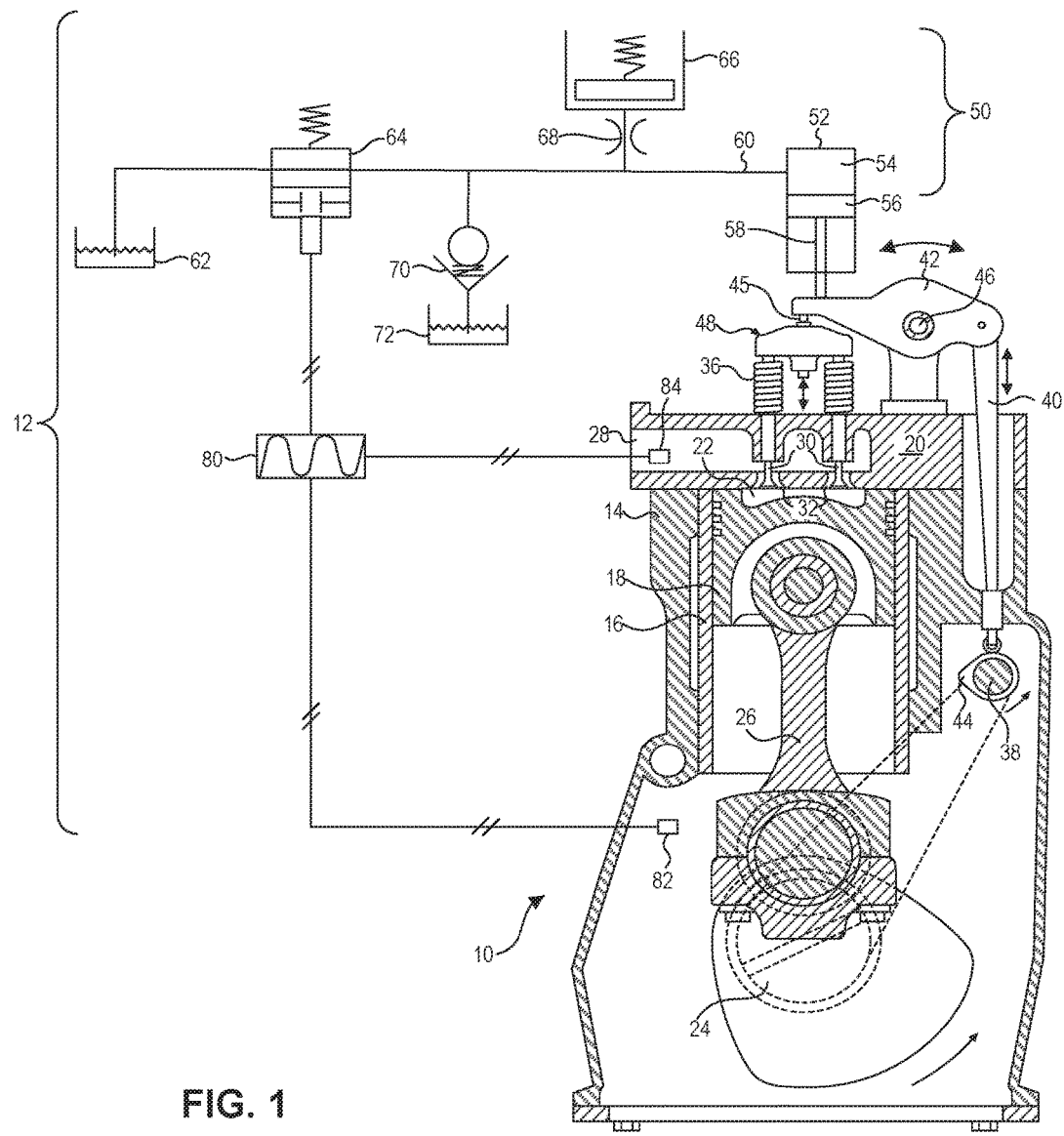
FIG. 1 is a diagrammatic illustration of an exemplary disclosed engine valve actuation system.

FIG. 1 illustrates an engine 10 equipped with an exemplary disclosed valve actuation system 12. For the purposes of this disclosure, engine 10 is depicted and described as a four-stroke diesel engine. One skilled in the art will recognize, however, that engine 10 may embody any type of combustion engine such as a two- or four-stroke, gasoline or gaseous fuel-powered engine. As will be described in more detail below, valve actuation system 12 may help regulate fluid flows through engine 10.

Engine 10 may include an engine block 14 that at least partially defines one or more cylinders 16. A piston 18 and a cylinder head 20 may be associated with each cylinder 16 to form a combustion chamber 22. Piston 18 may be slidably disposed within each cylinder 16 to reciprocate between a top-dead-center (TDC) position and a bottom-dead-center (BDC) position, and cylinder head 20 may be positioned to cap off an end of cylinder 16. Engine 10 may include any number of combustion chambers 22, and combustion chambers 22 may be disposed in an "in-line" configuration, in a "V" configuration, in an opposing-piston configuration, or in any other suitable configuration.

Engine 10 may also include a crankshaft 24 rotatably disposed within engine block 14. A connecting rod 26 may connect each piston 18 to crankshaft 24 so that a sliding motion of piston 18 between the TDC and BDC positions within each respective cylinder 16 results in a rotation of crankshaft 24. Similarly, a rotation of crankshaft 24 may result in a sliding motion of piston 18 between the TDC and BDC positions. In a four-stroke engine, piston 18 may reciprocate between the TDC and BDC positions through an intake stroke, a compression stroke, a power stroke, and an exhaust stroke. In a two-stroke engine, piston 18 may reciprocate between the TDC and BDC positions through a power/exhaust/intake stroke and an intake/compression stroke.

Cylinder head 20 may define one or more fluid passages 28 associated with each combustion chamber 22 that are configured to direct gas (e.g., air and/or exhaust) or a mixture of gas and liquid (e.g., fuel, or air/fuel) into or out of the associated chamber 22. In the disclosed embodiment, cylinder head 20 is shown as defining a single passage 28. Passage 28 may represent either an intake passage or an exhaust passage in this embodiment. It should be noted that, while only a single fluid passage 28 is shown, as many intake and/or exhaust passages may be provided within cylinder head 20 as desired. As an intake passage, passage 28 would be configured to deliver compressed air and/or an air and fuel mixture into a top end of combustion chamber 22. As an exhaust passage, passage 28 would be configured to direct exhaust and residual gases from the top end of combustion chamber 22 to the atmosphere. It is contemplated that, in some embodiments, only an exhaust passage may be formed within cylinder head 20, and the corresponding intake passage may instead be formed within engine block 14. In these configurations, the intake passage would be configured to direct air or the mixture of air and fuel radially inward to combustion chamber 22 through a side wall of cylinder 16.

One or more gas exchange valves 30 may be disposed within corresponding openings of passage 28 and movable to selectively engage corresponding seats 32. Specifically, each valve 30 may be movable between a first position at which valve 30 is engaged with seat 32 to inhibit a flow of fluid through the opening, and a second position at which valve 30 is moved away from seat 32 (i.e., lifted) to allow a flow of fluid through the opening. The timing at which valve 30 is moved away from seat 32 (relative to a position of piston 18 between the TDC and BDC positions), as well as a lift height of valve 30 at the particular timing, may have an effect on the operation of engine 10. For example, the timing and lift height may affect production of emissions, production of power, fuel consumption, efficiency, temperature, pressure, etc. A spring 36 may be associated with each valve 30 and configured to bias valve 30 toward the first position and against seat 32. A spring retainer (not shown) may connect spring 36 to a stem end of each valve 30.

Valve actuation system 12 may be operatively engaged with cylinder head 20 and configured to simultaneously move valves 30 against the biases of springs 36 from their first positions toward their second positions at desired timings. It should be noted that, when each cylinder head 20 is provided within both intake and exhaust passages and corresponding intake and exhaust valves, engine 10 may include a separate valve actuation assembly for each set of intake and exhaust valves. Each valve actuation system 12 may include, among other things, a common camshaft 38, a dedicated cam follower arrangement 40 (e.g., cam followers, push rods, etc.), and a dedicated rocker arm 42.

Camshaft 38 may operatively engage crankshaft 24 in any manner readily apparent to one skilled in the art, where a rotation of crankshaft 24 results in a corresponding rotation of camshaft 38. For example, camshaft 38 may connect to crankshaft 24 through a gear train (not shown) that decreases the rotational speed of camshaft 38 to approximately one half of the rotational speed of crankshaft 24 (in the exemplary 4-stroke arrangement). Alternatively, camshaft 38 may connect to crankshaft 24 through a chain, a belt, or in any other appropriate manner. At least one cam lobe 44 may be connected to camshaft 38 and associated with each pairing of valves 30. An outer profile of cam lobe 44 may determine, at least in part, the actuation timing and lift profile of valves 30 during operation of engine 10.

Cam follower arrangement 40 may ride on and move in accordance with the profile of cam lobe 44 as camshaft 38 rotates, and transfers a corresponding reciprocating motion to a first pivoting end of rocker arm 42. This reciprocating motion imparted to rocker arm 42 may cause rocker arm 42 to pivot about a pivot point 46, thereby creating a corresponding reciprocating motion at an opposing second end of rocker arm 42 that lifts and releases valves 30. Thus, the rotation of camshaft 38 may cause valves 30 to move from the first position to the second position to create a specific lift pattern corresponding to the profile of cam lobe 44.

Rocker arm 42 may be connected to valves 30 by way of a valve bridge assembly 48. Specifically, rocker arm 42 may include a pin or button 45 that is received within a bore (not shown) at the second end of rocker arm 42. Button 45 may be able to swivel somewhat within the bore of rocker arm 42, and include a generally flat end surface that is configured to slide along a corresponding planar portion of valve bridge assembly 48. The ability of button 45 to swivel and slide along the planar portion of valve bridge assembly 48 may allow rocker arm 42 to transmit primarily vertical (i.e., axial) forces into valve bridge assembly 48. The only horizontal (i.e., transverse) forces transmitted between rocker arm 42 and valve bridge assembly 48 may be relatively low and due only to friction at the sliding interface between button 45 and bridge assembly 48. This interface may be lubricated and/or polished to reduce the associated friction. It is contemplated that button 45 and/or bridge 48 may be omitted in some embodiments, such that rocker arm 42 directly engages valves 30.

The shape and orientation of cam lobe 44 may control the timing of the actuation of valves 30. As one skilled in the art will recognize, cam lobe 44 may be configured to coordinate the actuation of valves 30 with the movement of piston 18. For example, cam lobe 44 may be configured to actuate valves 30 with a conventional valve timing. For illustrative purposes only, valves 30 herein are assumed to be intake valves. As one skilled in the art would appreciate, descriptions of intake valves may be similarly applied to exhaust valves. In a conventional valve timing, valves 30 may be actuated to open passage 28 when piston 18 is at or near a TDC position at the beginning of an intake stroke to allow air to flow from passageway 28 into cylinder 16. In the conventional valve timing, valves 30 may return to a closed position when piston 18 is at or near a BDC position at the end of the intake stroke to stop the flow of air into cylinder 16.

As aforementioned, adjustment of the conventional actuation timing of valves 10 may be desired to improve engine efficiency. Accordingly, valve actuation system 12 may further include a variable valve actuator assembly ("actuator") 50 that may be adapted to vary the actuation timing of valves 30. For example, the valve actuation timing may be extended or shortened from the timing dictated by the shape of cam lobe 44.

Actuator 50 may include an cylinder or housing 52 that at least partially defines a chamber 54. A piston or plunger 56 may be slidably disposed within housing 52 and connected to a rod 58. A return spring (not shown) may act on plunger 56 to return plunger 56 to a home position. Rod 58 may be engageable with the second end of rocker arm 42 when plunger 56 pushes rod 50 to extend through housing 52. It should be noted that rod 58 may engage another portion of rocker arm 42, if desired.

A fluid line 60 may connect to a source 62 with chamber 54. Pressurized fluid may be directed from source 62 through fluid line 60 into chamber 54 to move plunger 56 within housing 52 from the home position to the extended position. Movement of plunger 56 may cause rod 58 to engage the second end of rocker arm 42 and halt movement.

Fluid may be introduced chamber 54 at a time when valves 30 are in the open position, such that rod 58 moves into engagement with rocker arm 42 and thereby hold valves 30 in the open position. Alternatively, fluid may be introduced to chamber 54 when valves 30 are in the closed position such that rod 58 moves into engagement with rocker arm 42 and forces rocker arm 42 to pivot and thereby open valves 30.

The fluid contained within source 62 may be, for example, a hydraulic fluid, a lubricating oil, a transmission fluid, or fuel. Source 62 may increase the pressure of the fluid and may be part of a lubrication system, such as typically accompanies an internal combustion engine. Alternatively, source 62 may be a pre-lube pump configured to provide fluid at a higher pressure, such as, for example, between about 10 MPa and 35 MPa (1450 psi and 5000 psi).

Actuator 50 may further include a control valve 64 disposed in fluid line 60, between source 62 and chamber 54. Control valve 64 may be selectively opened to allow a flow of fluid from source 62 to enter chamber 54. Control valve 64 may be selectively closed to prevent pressurized fluid from flowing between source 62 and chamber 54. Control valve 64 may be normally biased into the closed position, and actuated to allow fluid to flow into chamber 54. Alternatively, control valve 64 may be normally biased into the open position, and actuated to prevent fluid from flowing through control valve 64. One skilled in the art will recognize that control valve 64 may be any type of controllable valve, for example a two-coil latching valve.

In some embodiments, actuator 50 may also include a damper 66 connected to fluid line 60 via a restrictive orifice 68. Damper 66 and orifice 68 may work together to prevent pressure oscillations or absorb shock loading in chamber 54 and fluid line 60.

Actuator 50 may also include a low-pressure relief valve 70 disposed in fluid line 60, between control valve 64 and housing 52. Low-pressure relief valve 70 may be normally biased into a closed position (e.g., via a spring) and remain closed during normal engine operation. Low-pressure relief valve 70 may be actuated to allow fluid to release or discharge from actuator 50 (including chamber 54 and fluid line 60) upon shut-down of engine 10. The fluid discharged via low-pressure relief valve 70 may flow into an external fluid receiver 72. The release of fluid from actuator 50 may improve engine efficiency at cold start-up at a time when the fluid is cold and viscous. Low-pressure relief valve 70 may remain closed, when a pressure of the fluid is above a specified pressure, and open only at or below the specified pressure. The specified pressure may be, for example about 50 kpa. One skilled in the art will recognize that low-pressure relief valve 70 may be replaced with another type of valve, if desired.

Valve actuation system 12 may further include a controller 80 in communication with actuator 50, for example, with control valve 64. Controller 80 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 80 may be configured to provide a signal to selectively move control valve 64 during engine operation. For example, for a normally-open control valve, controller 80 may send an electrical current or voltage signal to control valve 64 to cause control valve 64 to close. Alternatively, for a normally-closed control valve, controller 80 may send an electrical signal to control valve 64 to cause control valve 64 to open. Further controller 80 may cycle control valve 64 (i.e., move control valve 64 between the open and closed positions) to free up control valve 64 prior to start-up of engine 10, for example during a cold start-up of engine 10 to help ensure that control valve 64 is operable in a highly viscous fluid. The cycling may be conducted prior to activation of an associated lube system of engine 10, for example, prior to start-up of a pre-lube pump (e.g., a pre-lube pump associated with source 62). The cycling of control valve 64 may be conducted by controller 80 sending a periodic electrical signal to control valve 64. This may cause control valve 64 to move quickly in the highly viscous fluid. The cycling may be performed for a certain number of times, for example, 20 times.

Controller 80 may receive information from one or more sensors operatively connected with engine 10. Each of the sensors may be configured to sense an operating parameter of engine 10 and generate a corresponding signal. For example, a first temperature sensor 82 may be configured to provide an indication of a temperature of coolant inside engine 10 and a second temperature sensor 84 may be configured to provide an indication of an intake manifold air temperature. In addition, controller 80 may be connected to one or more sensors (not shown) disposed in fluid line 60 to provide a temperature and/or pressure signal associated with the fluid inside actuator 50.

Figure 2:
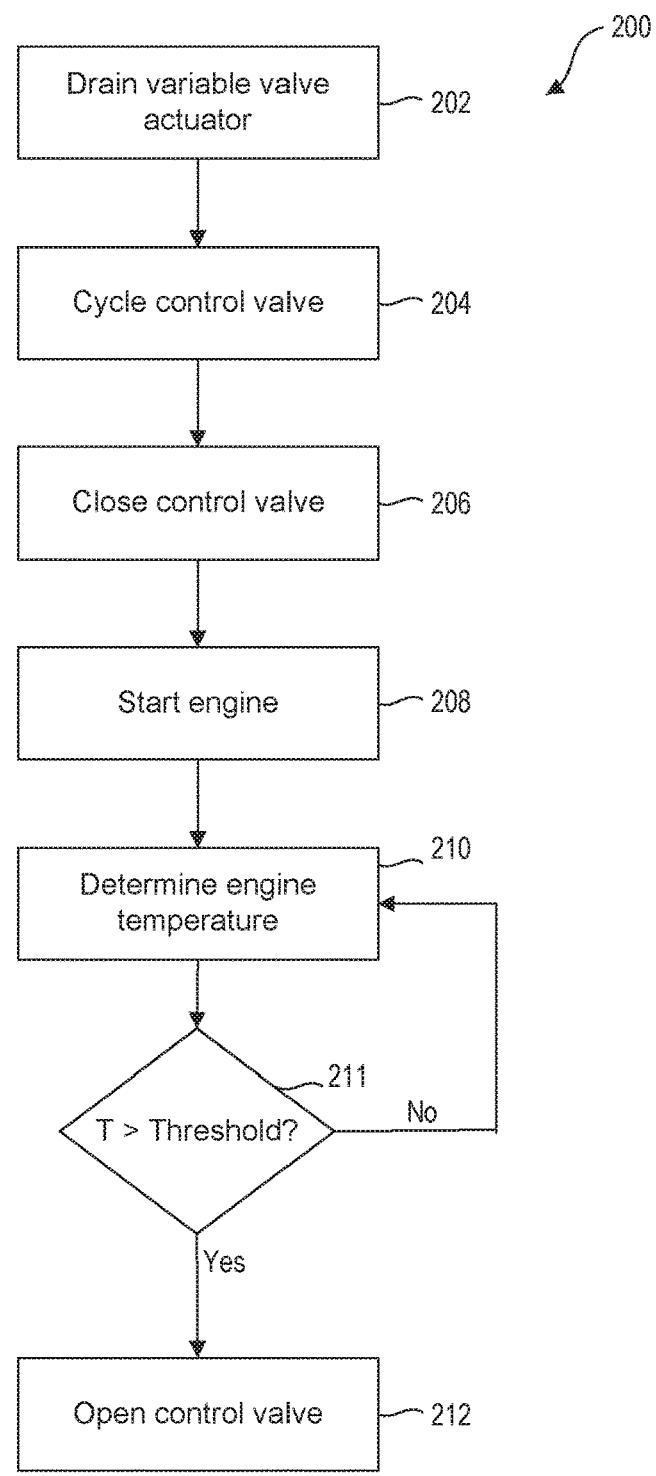
FIG. 2 is a flow chart illustrating an exemplary disclosed method that may be performed by the valve actuation system of FIG. 1.
Figure 3:
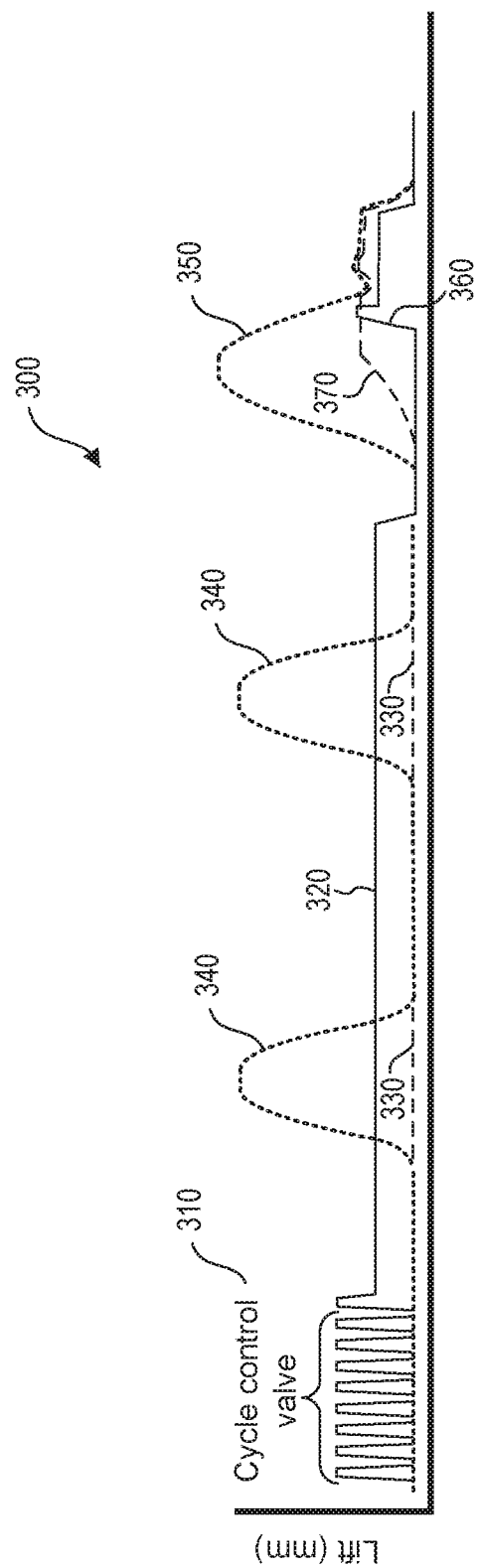
FIG. 3 is a graph illustration of an exemplary disclosed movement of a control valve during implementation of the method of FIG. 2.

FIG. 2 is a flow chart illustrating an exemplary disclosed method of operating engine 10 that may be performed by valve actuator 50 FIG. 1. FIG. 3 is a graphical illustration of an exemplary disclosed movement of control valve 64 during implementation of the method of FIG. 2. The details of FIG. 2 and FIG. 3 will be described below.

INDUSTRIAL APPLICABILITY

The disclosed valve actuation system may be applicable to any internal combustion engine. The valve actuation system may be used to cycle a control valve of a variable valve actuator and thereby facilitate cold start-up of the engine. In addition, the valve actuation system may facilitate cold start-up of the engine by draining fluid from the variable valve actuator via a low-pressure relief valve during a prior shut-down of the engine. Operation of the disclosed valve actuation system will now be explained.

After engine 10 is shut down and/or after the pre-lube pump associate with source 62 is also stopped, a pressure of the fluid inside valve actuation system 12 may drop to a specified pressure threshold, for example, to about 50 kpa. Below this threshold, low-pressure relief valve 70 may automatically open to drain or release the fluid inside variable valve actuator 50 (Step 202). At this time, control valve 64 may be in a closed position, preventing any additional fluid from entering actuator 50. Alternatively, control valve 64 may be in the open position at this time, however, no fluid is able to flow into actuator 50 via control valve 64 due to shut-down of engine 10 and/or the pre-lube pump.

Prior to start-up of engine 10, for example, during a cold start-up, the fluid inside engine 10 may have a viscosity high enough to cause control valve 64 to stick and/or move slower than desired. In this situation, controller 80 may send a periodic electrical current signal to cycle control valve 60 for a certain number of times to free up control valve 64 (Step 204). An exemplary cycling 310 of a normally-open control valve 64 with a periodic current signal is depicted in a graph 300 FIG. 3. Cycling 310 may be conducted prior to start-up of engine 10 and prior to activation of the pre-lube pump.

After cycling of control valve 64, control valve 64 may be placed in a closed position by controller 80 (if it is open prior to cycling) or may remain in a closed position (if it is closed prior to cycling) (Step 206). Closing control valve 64 can prevent cold fluid from entering actuator 50 prior to engine start-up and/or the activation of the pre-lube pump.

Engine 10 may be started (step 208) after cycling of control valve 64 and after closing control valve 64. A first temperature of engine 10 may be determined by controller 80 after start-up, for example via first temperature sensor 82 (Step 210). Control valve 64 may remain closed during engine start-up and engine warm-up until an engine temperature threshold is reached. The specified temperature threshold may be, for example, approximately 20° C. (68° F.).

As long as the first temperature is determined to be less than the specified temperature threshold (Step 211), control valve 64 may remain in the closed position. During this time, actuator 50 may not engage rocker arm 42 or cause implementation of a variation on the conventional valve actuation timing. In FIG. 3, after cycling 310, normally-open control valve 64 is placed in the closed position by controller 80 through applying of a constant electrical current signal 320 to control valve 64. This may continue until the engine temperature rises above the specified temperature threshold. That is, during cold temperature, the lifting of valve 30 (as indicated by a conventional lift profile 340) may be driven solely by the profiled cam lobe 44, and rod 58 may not engage the second end of rocker arm 42. This is demonstrated by lift profile 330 of rod 58 in FIG. 3.

When the first temperature is determined to be equal to or greater than the specified temperature threshold (Step 211), control valve 64 may be moved to the open position by controller 80 (Step 212). For example, if control valve 64 is a normally-open valve, controller 80 may stop sending an electrical current signal to control valve 64 to cause control valve 64 to be in the open position (see electrical current signal profile 360 of FIG. 3). Alternatively, if control valve 64 is a normally-closed valve, controller 80 may send an electrical current signal to control valve 64 to cause control valve 64 to be in the open position.

With the first temperature rises above the specified temperature threshold, the fluid viscosity may decrease to allow actuator 50 to operate properly. Accordingly control valve 64 may be moved to the open position, allowing pressurized fluid to flow from source 62 via fluid line 60 to chamber 54. The force of the fluid entering chamber 54 may move plunger 56, so that rod 58 follows the second end of rocker arm 42 as rocker arm 42 pivots to open valve 30. When chamber 54 is filled with fluid and rocker arm 42 attempts to pivot away from valve 30, rod 58 may engage the second end of rocker arm 42 to prevent valve 30 from moving to the closed position. This may allow the implementation of a variation on the conventional valve actuation timing. Valve actuator 50 may hold valves 30 in the open position, independent of the profile of cam lobe 44 (see lift profile 370 of rod 50 and lift profile 350 of valve 30 in FIG. 3).

Control valve 64 may close to allow valve 30 to move in accordance with a conventional engine cycle. If control valve 64 is a normally-open valve, controller 80 may send an electrical current signal to control valve 64 to cause control valve 64 to be in the closed position (see electrical current signal profile 360 in FIG. 3). Alternatively, if control valve 64 is a normally-closed valve, controller 80 may stop sending an electrical current signal to control valve 64 to cause control valve 64 to be in the closed position. The closing of control valve 64 may allow the fluid to flow out of chamber 54 (e.g., via one or more leak parts). The restoring force of valve spring 36 may also facilitate the fluid flow out of chamber 54, by pushing the second end of rocker arm 42 upwards against rod 58, thereby urging plunger 56 to move into housing 52. This may allow rocker arm 42 to pivot, so that valve 30 is free to close.

In some embodiments, controller 80 may be configured to implement a passive mode of operation at a time when fluid temperatures are warming but are still colder than desired. Actuator 50 may operate in the passive mode after control valve 64 has been opened and the first temperature has risen above the specified temperature threshold. Because the operating fluid at the specified temperature threshold may still have a relatively high viscosity compared to the fluid viscosity experienced during normal operation of actuator 50, actuator 50 may still not work quite properly. In the passive mode, control valve 64 may be allowed to remain open all the time, until the first temperature rises above another temperature threshold that is greater than the specified temperature threshold. During operation in the passive mode, the fluid may move freely in and out of actuator 50, and a pressure of the fluid may be too low to prevent rocker arm 42 from pivoting. Thus, actuator rod 58 may simply follow the reciprocating movement of the second end of rocker arm 42 without varying the conventional valve actuation timing. That is, the pivoting motion of rocker arm 42 may function to pump the fluid into and out of actuator 50, thereby moving the fluid and lubricating actuator 50.

During operation in the passive mode, a second temperature of engine 10 may be determined. For example, the temperature inside passage 28, as sensed by another temperature sensor 84, may be determined by controller 80 and used to initiate and terminate the passive mode. That is, if the second temperature is above a temperature at which the operating fluid reaches a suitable viscosity, then the passive mode may be terminated via controller 80.

Several benefits may be realized through use of the described system. For example, cycling of control valve 64 may facilitate proper operation of variable valve actuator 50 and improve the reliability and performance of engine 10. In turn, the proper operation of variable valve actuator 50 may facilitate subsequent cold start-up of the engine by urging valves 30 to close as desired, and accordingly adequate compression can be obtained in combustion chamber 22.

It will be apparent to those skilled in the art that various modifications and variations can be made to the disclosed valve actuation system. Other embodiments will be apparent to those skilled in the art from consideration of the specification and practice of the disclosed valve actuation system. It is intended that the specification and examples be considered as exemplary only, with a true scope being indicated by the following claims and their equivalents.

What is claimed is:

1. A valve actuation system for an engine, comprising:
a cam follower configured to ride on and move in accordance with a profile of a cam lobe;
a rocker arm having a first end operatively connected to the cam follower;
a valve operatively connected to a second end of the rocker arm;
a variable valve actuator configured to engage the rocker arm and hold the valve at an open position regardless of motion of the cam lobe, wherein the variable valve actuator comprises:
a housing forming a chamber;
a plunger disposed in the chamber;
a control valve movable to control a flow of fluid into the chamber; and
a relief valve configured to automatically open and release fluid from the housing when a pressure inside the chamber is below a predetermined pressure value; and
a controller in communication with the control valve configured to cycle, via a periodic control signal to the control valve, the control valve prior to start-up of the engine and start-up of a lubrication system associated with the variable valve actuator, and to selectively move the control valve after the start-up of the engine and the lubrication system,
wherein the controller cycles the control valve by moving the control valve between an open position and a closed position a predetermined number of times greater than one, and
wherein the controller is configured to control, after the cycling of the control valve, the control valve to close, via a first constant control signal to the control valve, prior to the start-up of the engine and the lubrication system, and to hold the control valve closed during the start-up of the engine until a temperature associated with the engine reaches a predetermined temperature threshold.

2. The valve actuation system of claim 1, wherein the variable valve actuator includes a damper configured to absorb shock loading from the fluid.

3. The valve actuation system of claim 1, wherein the predetermined pressure value is 50 kpa.

4. The valve actuation system of claim 1, wherein the controller is configured to control, after the cycling of the control valve, the control valve to open, via a second constant control signal to the control valve, when the fluid reaches the predetermined temperature threshold, to supply the fluid to the housing of the variable valve actuator.

5. The valve actuation system of claim 1, wherein the controller is configured to implement a passive mode operation of the variable valve actuator.

6. The valve actuation system of claim 5, wherein the controller is configured to convert the passive mode operation to a normal mode operation of the variable valve actuator by determining a second engine temperature.

7. A method of controlling an engine, comprising:
cycling, using a periodic control signal, a control valve of a variable valve actuator prior to start-up of the engine and start-up of a lubrication system associated with the variable valve actuator, wherein said cycling the control valve includes moving the control valve between an open position and a closed position a predetermined number of times greater than one;
controlling, after said cycling the control valve, the control valve to close, via a constant control signal to the control valve, prior to the start-up of the engine and the lubrication system, and to hold the control valve closed during the start-up of the engine until a temperature associated with the engine reaches a predetermined temperature threshold;
moving the control valve during engine operation to hydraulically adjust valve timing for the engine; and
releasing fluid from the control valve when a pressure of the fluid falls below a predetermined pressure value after shut-down of the engine.

8. The method of claim 7, further including starting a pre-lube pump of the lubrication system after said cycling the control valve and prior to cranking of the engine to start the engine.

9. The method of claim 7, wherein said releasing the fluid from the control valve includes releasing the fluid prior to moving the control valve to the closed position.

10. The method of claim 7, wherein the predetermined pressure is 50 kpa.

11. The method of claim 7, further including implementing a passive mode operation of the variable valve actuator.

12. The method of claim 11, further including converting the passive mode operation to a normal mode operation of the variable valve actuator when engine temperature rises above a second temperature.

13. A variable valve actuator for an engine, comprising:
a housing forming a chamber;
a plunger slidably disposed in the chamber;
a control valve movable to control a flow of fluid into the chamber;
a relief valve configured to automatically open and release fluid from the variable valve actuator when a pressure inside the chamber is below a predetermined pressure; and
a controller in communication with the control valve configured to cycle, via a periodic control signal to the control valve, the control valve prior to start-up of the engine and start-up of a lubrication system associated with the control valve, and to selectively move the control valve after the start-up of the engine and the lubrication system,
wherein the controller cycles the control valve by moving the control valve between an open position and a closed position a predetermined number of times greater than one,
wherein, when a temperature associated with the engine is at or above a first predetermined temperature threshold, the controller controls the control valve according to a passive mode whereby the control valve is in an open state at all times to allow the fluid to flow therethrough and without varying timing of the valve, and
wherein, when the temperature associated with the engine is at or above a second predetermined temperature threshold, the controller discontinues control of the control valve in the passive mode and controls the control valve according to an active mode whereby the control valve is controllable to the open state to allow the fluid to flow therethrough and to vary the timing of the valve.

14. The variable valve actuator of claim 13, further including a damper configured to absorb shock loading.

15. The variable valve actuator of claim 13, wherein the predetermined pressure value is 50 kpa.

16. The variable valve actuator of claim 13, wherein the controller is configured to:
   after the cycling of the control valve, control the control valve to close, via a constant control signal to the control valve, prior to the start-up of the engine and the lubrication system, and to hold the control valve closed during the start-up of the engine, and
   hold the control valve closed until the temperature associated with the engine reaches the first predetermined temperature threshold, and control the control valve to open responsive to the temperature associated with the engine reaching the first predetermined temperature threshold to supply the fluid to the chamber of the housing.

17. The variable valve actuator of claim 13, wherein, when the controller controls the control valve according the passive mode, a rocker arm pumps, via a rod, the fluid into and out of the chamber of the housing to provide lubrication thereto.

* * * * *